United States Patent
Schwiesow

(10) Patent No.: US 7,359,057 B2
(45) Date of Patent: Apr. 15, 2008

(54) METHOD AND APPARATUS FOR MEASURING SMALL SHIFTS IN OPTICAL WAVELENGTHS

(75) Inventor: Ronald Lee Schwiesow, Boulder, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 114 days.

(21) Appl. No.: 11/213,465

(22) Filed: Aug. 26, 2005

(65) Prior Publication Data

US 2007/0046945 A1  Mar. 1, 2007

(51) Int. Cl.
*G01B 9/02* (2006.01)

(52) U.S. Cl. .................................. 356/451
(58) Field of Classification Search .............. 356/484, 356/451, 456, 496, 485
See application file for complete search history.

(56) References Cited

U.S. PATENT DOCUMENTS

| | | | |
|---|---|---|---|
| 3,822,942 A | 7/1974 | Hock | |
| 3,891,321 A | 6/1975 | Hock | |
| 4,379,633 A | 4/1983 | Bickel et al. | |
| 4,575,245 A | 3/1986 | Borde | |
| 4,655,587 A | 4/1987 | Wijntjes et al. | |
| 4,711,573 A | 12/1987 | Wijntjes et al. | |
| 4,735,503 A | 4/1988 | Werner et al. | |
| 4,832,492 A | 5/1989 | Calvani et al. | |
| 4,968,144 A | 11/1990 | Thomas et al. | |
| 5,018,862 A | 5/1991 | Aiello | |
| 5,059,027 A * | 10/1991 | Roesler et al. ............. 356/456 |
| 5,153,677 A | 10/1992 | Keck et al. | |
| 5,172,186 A | 12/1992 | Hosoe | |
| 5,245,473 A | 9/1993 | Stanton et al. | |
| 5,274,436 A | 12/1993 | Chaney | |
| 5,289,434 A * | 2/1994 | Berni ...................... 367/178 |
| 5,305,088 A | 4/1994 | Hosoe | |
| 5,422,721 A * | 6/1995 | Ryan ....................... 356/451 |
| 5,642,194 A | 6/1997 | Erskine | |
| 5,818,592 A | 10/1998 | Womack et al. | |
| 5,872,621 A | 2/1999 | Wilkerson et al. | |
| 5,872,628 A | 2/1999 | Erskine | |
| 5,872,629 A | 2/1999 | Colvard | |
| 5,877,856 A | 3/1999 | Fercher | |
| 5,892,583 A | 4/1999 | Li | |

(Continued)

OTHER PUBLICATIONS

Schwiesow, R.L. and Mayor, S.D.; *Coherent Optical Signal Processing for a Doppler Lidar using a Michelson Interferometer*, reprinted from *Coherent Laser Radar*, vol. 19, OSA Technical Digest Series (Optical Society of America, Washington, D.C., 1995), pp. 212-215; 4 pages.

(Continued)

*Primary Examiner*—Tarifur Chowdhury
*Assistant Examiner*—Jonathan M Hansen
(74) *Attorney, Agent, or Firm*—Sheridan Ross P.C.

(57) ABSTRACT

A method and apparatus for detecting small shifts in optical wavelength is provided. Light having a known wavelength is directed towards a target volume in the atmosphere. Light reflected from the target volume is received and mixed with differentially delayed copies of itself to produce three interference signals. The interference signals are taken at delays spanning one-half the wavelength of the transmitted signal. The intensity of the signal at the three different delays is measured simultaneously, from which the wavelength of the reflected signal can be determined.

34 Claims, 13 Drawing Sheets

U.S. PATENT DOCUMENTS

| | | | |
|---|---|---|---|
| 5,905,572 A | 5/1999 | Li | |
| 5,910,839 A | 6/1999 | Erskine | |
| 5,943,132 A | 8/1999 | Erskine | |
| 5,949,546 A | 9/1999 | Lee et al. | |
| 5,956,355 A | 9/1999 | Swanson et al. | |
| 6,014,214 A | 1/2000 | Li | |
| 6,057,920 A | 5/2000 | Fercher et al. | |
| 6,115,121 A | 9/2000 | Erskine | |
| 6,137,574 A | 10/2000 | Hill | |
| 6,147,747 A | 11/2000 | Kavaya et al. | |
| 6,160,826 A | 12/2000 | Swanson et al. | |
| 6,191,862 B1 | 2/2001 | Swanson et al. | |
| 6,208,424 B1 | 3/2001 | De Groot | |
| 6,252,667 B1 | 6/2001 | Hill et al. | |
| 6,271,923 B1 | 8/2001 | Hill | |
| 6,297,878 B1 | 10/2001 | Miller | |
| 6,313,918 B1 | 11/2001 | Hill et al. | |
| 6,351,307 B1 | 2/2002 | Erskine | |
| 6,396,577 B1 | 5/2002 | Ramstack | |
| 6,462,826 B1 | 10/2002 | Howard | |
| 6,473,184 B1 * | 10/2002 | Ishizuka et al. | 356/499 |
| 6,476,943 B1 | 11/2002 | Yertoprakhov | |
| 6,485,413 B1 | 11/2002 | Boppart et al. | |
| 6,507,441 B1 | 1/2003 | Eisenberg et al. | |
| 6,512,588 B1 | 1/2003 | Hill | |
| 6,541,759 B1 | 4/2003 | Hill | |
| 6,631,004 B1 | 10/2003 | Hill et al. | |
| 6,634,600 B2 | 10/2003 | Krawczyk et al. | |
| 6,665,456 B2 | 12/2003 | Dave et al. | |
| 6,724,486 B1 | 4/2004 | Shull et al. | |
| 6,977,730 B2 * | 12/2005 | Evans | 356/496 |
| 2001/0005263 A1 | 6/2001 | Fabre et al. | |
| 2002/0036766 A1 | 3/2002 | Krawczyk et al. | |
| 2002/0105632 A1 | 8/2002 | Holton | |
| 2002/0175294 A1 | 11/2002 | Lee et al. | |
| 2003/0007156 A1 | 1/2003 | De Groot et al. | |
| 2003/0020920 A1 | 1/2003 | Dave et al. | |
| 2003/0025913 A1 | 2/2003 | Izatt et al. | |
| 2003/0025917 A1 | 2/2003 | Suhami | |
| 2003/0030001 A1 | 2/2003 | Cooper et al. | |
| 2003/0043364 A1 | 3/2003 | Jamieson et al. | |
| 2003/0048495 A1 | 3/2003 | Vertoprakhov | |
| 2003/0053073 A1 | 3/2003 | Hill | |
| 2003/0053079 A1 | 3/2003 | Hill | |
| 2003/0067605 A1 * | 4/2003 | McGuire | 356/450 |
| 2003/0095265 A1 | 5/2003 | Hill | |
| 2003/0137669 A1 | 7/2003 | Rollins et al. | |
| 2003/0174339 A1 | 9/2003 | Feldchtein et al. | |
| 2003/0211402 A1 | 11/2003 | Hill | |
| 2003/0219252 A1 | 11/2003 | Hays | |
| 2003/0223077 A1 | 12/2003 | Hill | |
| 2004/0021874 A1 | 2/2004 | Shimmick | |
| 2004/0076390 A1 | 4/2004 | Yang et al. | |
| 2006/0055935 A1 * | 3/2006 | Cheben et al. | 356/451 |
| 2006/0232781 A1 * | 10/2006 | Kranz et al. | 356/451 |

OTHER PUBLICATIONS

*CALIPSO*; Ball Aerospace & Technologies Corp.; http://www.ballaerospace.com/pdf/calipso.pdf; 2004; 2 pages.

Soltesz, A.; *WINDII Instrument Description*; http://www.windii.yorku.ca/instrument_e.html; Feb. 23, 2000; 2 pages.

*MACAWS—Multi-Center Airborne Coherent Atmospheric Wind Sensor*, http://www.ghcc.msfc.nasa.gov/macaws; May 9, 2000; 12 pages.

*ICESat/GLAS*; Center for Space Research, University of Texas, NASA Goddard, Greenbelt, MD; http://www.csr.utexas.edu/glas/Instrument_Description; Jan. 1999; 2 pages.

*How Will ICESat Measure Earth's Ice, Clouds, Land, and Vegetation*, Operational Overview; http://icesat.gsfc.gov/docs/ICESat_Brochure_Page_09.png; printed Feb. 8, 2005; 2 pages.

*CALIOP, Instrumentation*; Calipso; http://www-calipso.larc.nasa.gov/instrument; Feb. 8, 2005; 2 pages.

Jay, Zwally, et al; *GLAS/ICESat L1A Global Engineering Data*; http://nsidc.org/data/gla03.html; 2003; 2 pages.

*Release*; National Snow and Ice Data Center, http://nsidc.org/daac/icesat; Jan. 18, 2005; 1 page.

* cited by examiner

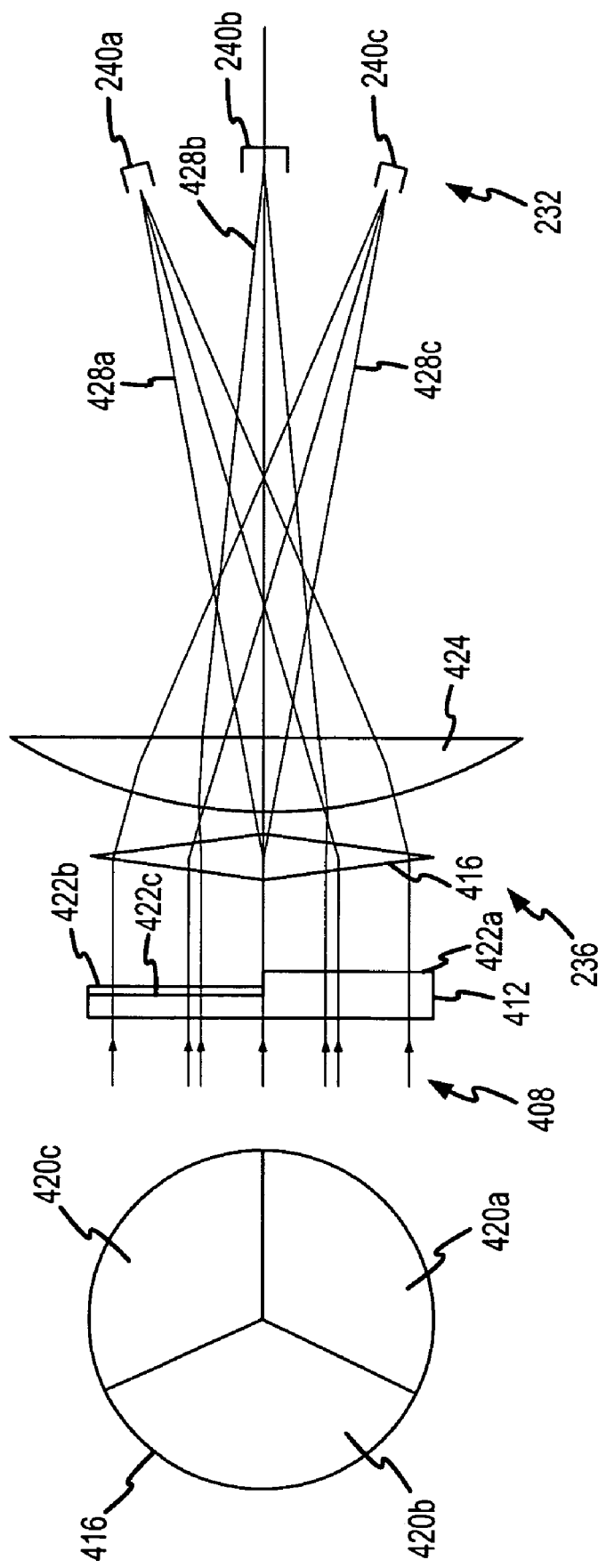

METHOD AND APPARATUS FOR MEASURING SMALL SHIFTS IN OPTICAL WAVELENGTHS

FIELD OF THE INVENTION

The present invention is directed to measuring small shifts in optical wavelengths. In particular, the present invention provides an interferometer capable of making multiple delay measurements in parallel in order to measure a Doppler shift in an optical wavelength.

BACKGROUND OF THE INVENTION

Wind profiles in the troposphere represent one of the major unfilled measurement needs for improving global weather forecasting and analysis. Various approaches for global tropospheric wind profiling that are based on Doppler lidar have been proposed and/or developed. However, these techniques have various limitations, especially when the wavelength of the light in connection with which the shift is being measured is shorter than 5-10 micrometers. Such limitations result from various factors, such as distortion of propagating optical wavefronts (as in the twinkling of stars) by inhomogeneities in the refractive index of the atmosphere, the size of the Doppler shift (e.g., where it is too large for direct frequency measurement and too small for normal spectroscopic techniques), and inefficiency in the use of the received light.

In general, techniques for measuring wind profiles in the troposphere have involved the use of Doppler lidars (light detection and ranging). In such systems, light from a laser source is directed towards a target volume in the atmosphere. Particles and molecules in the target volume will scatter the light, with some of the scattered light being reflected back towards the laser source. By measuring the change in the wavelength of the reflected light as compared to the wavelength of the laser source, the velocity component of particles and molecules within the volume along the direction of the laser beam, can be determined.

In order to determine the Doppler shift, heterodyne detection, in which the optical return is mixed with an optical local oscillator to give the Doppler difference frequency (beat frequency) in the radio frequency (RF) region, has been used. In such systems, the radio frequency signal is typically digitized and processed via digital time delay autocorrelation (single or multiple lag) to give the Doppler shift from the wind component. Alternatively, radio frequency spectrum analyzers based on a scanning filter or a discrete filter bank can be used. However, heterodyne detection has rarely been used at wavelengths shorter than about 2.1 micrometers, because the Doppler difference frequency is too high to digitize and process electronically, and because the heterodyne conversion gain is not needed with low noise detectors at shorter wavelengths.

Direct detection of the Doppler shift is commonly used with visible (VIS) and ultraviolet (UV) Doppler lidars. In principle, signal processing and direct detection devices can be done either in optical frequency (wavelength) space or in time delay (autocorrelation) space. More particularly, direct detection devices have used Fabry-Perot interferometers, which are narrow band, optical, band pass filters. Specific Fabry-Perot approaches have been based on edge detection, a linearized ring pattern, and other techniques. In general, Fabry-Perot approaches are the optical analog of electronic scanning filter or filter bank spectrum analyzers.

In connection with the remote measurement of wind velocities, Doppler lidars using relatively short wavelengths (e.g., near 1 micrometer) are desirable. In particular, shorter wavelength lidar offers better range and velocity resolution for measurements in the turbulent boundary layer because the product of range resolution and spectral width of the velocity spectrum is proportional to the wavelength. In addition, the quantized backscattering coefficient (i.e., the number of photons backscattered for a given transmitted pulse energy) may be greater near 1 micrometer than at longer wavelengths, such as about 10.6 micrometers, for particular size distributions having a relatively small mean particle size. However, operating at shorter wavelengths has been difficult using conventional techniques. For example, in connection with optical heterodyne detection, the beat frequencies at such short wavelengths are high enough (about 2 MHz per 1 meter per second near a wavelength of 1 micrometer) to require expensive analog to digital converters and extremely high data rates for digital processing. Furthermore, inhomogeneities in atmospheric refractive index limit the effective aperture of lidar telescopes for heterodyning.

Doppler lidars operating at wavelengths near 0.5 micrometers that use optical heterodyne detection have been investigated. However, because of difficulties with optical heterodyning in the associated spectral region, they have not been pursued. Instead, Doppler lidars operating at 0.5 micrometers and shorter wavelengths have been based on signal processing using narrow transmission filters (the "edge" technique) or using configurations of Fabry-Perot interferometers, including either scanning, multiple fixed etalons, or displaced ring patterns with a spatially extended scattering source. However, such devices make relatively inefficient use of photons and require relatively complex hardware.

SUMMARY OF THE INVENTION

The present invention is directed to solving these and other problems and disadvantages of the prior art. In accordance with embodiments of the present invention, returns from a Doppler lidar are processed by using direct, coherent optical processing, rather than filters or optical heterodyne detection. As a result, lidar operation at shorter wavelengths is practical, while the problems and limitations associated with heterodyning at such wavelengths and those associated with using optical filters or a Fabry-Perot interferometer are avoided.

In accordance with embodiments of the present invention, light from a source having a known wavelength is reflected from a target. The received optical signal is divided into first and second optical paths or beams. The portion of the received optical signal comprising the second beam is further segmented into three different delays as compared to the light comprising the first beam. The light from the two paths is then recombined (i.e., the light from the different paths is allowed to interfere). The intensities of the three different interference signals thus obtained are measured, and the ratios of the different measured intensities are used to determine the phase shift between the signals in the two beams. That is, because of the path length difference, light at different wavelengths will produce different intensity measurements.

In accordance with embodiments of the present invention, the delays introduced with respect to the segments of the portion of the return signal comprising the second optical beam as compared to the first optical beam are selected such that the minimum period of delay is separated from the maximum period of delay by an amount corresponding to one-half a wavelength of the laser light source. Furthermore, the intermediate delay is selected such that it falls halfway between the minimum and maximum delays.

In accordance with embodiments of the present invention, the different delays introduced with respect to different portions of the return signal comprising the second beam are obtained by using a segmented mirror having reflective surfaces that are separated from one another by a distance equal to one-eighth of a wave in the direction of incidence. In accordance with still other embodiments of the present invention, the different recombined beams can be separated from one another and angled by a segmented prism. In accordance with other embodiments of the present invention, the different delays are introduced using one or more phase retarders. The divided beams can then be focused on detectors using lenses.

In accordance with further embodiments of the present invention, a method for measuring small shifts in optical wavelengths is provided. According to such embodiments, a pulsed laser transmitter may be used to generate an electromagnetic wave of wavelength $\lambda_o$ and pulse length $\tau$ into an atmosphere having distributed molecular and aerosol scattering. A return signal is received comprising a continuous wave train that is the sum of waves scattered by the distributed scatters in the atmosphere. Furthermore, the return signal has a mean wavelength that is shifted by $\delta\lambda$ (t) as a result of the mean Doppler shift. The received return signal is split into first and second optical paths to form first and second beams. The difference in path lengths of the first and second optical paths is selected to provide adequate measurement sensitivity, which increases with increasing difference in the delay paths, and the desired measurement range, which decreases with increasing path difference. The light directed along the two paths is then recombined, and measurements are taken at three different, but closely spaced, optical delays. More particularly, the delays are selected such that they are each separated by one-quarter $\lambda_o$.

In accordance with further embodiments of the present invention, the determination of intensities of the recombined signals at different delays is performed at the same time (t). Furthermore, the different delays are achieved by segmenting the second optical path into three different path lengths. Three detectors are provided to determine the intensity of the signal resulting from the three different signals resulting after recombining the light sent along the first optical path with the three segments of light sent along the second optical path. A sine function of known amplitude, phase and offset (three unknowns) can be fitted uniquely to the three data points and the wavelength of the return signal can thus be obtained. Furthermore, the difference between the wavelength of the return signal and the wavelength of the light source, which is the result of the Doppler shift caused by relative motion between the location of the measurement instrument and the molecules and/or particles in the measured volume, can then be determined. From this information, the relative velocity of the molecules and/or particles can be calculated.

In accordance with still other embodiments of the present invention, the measurement device may be calibrated by adjusting the optical delays such that the first and third delays provided interference signals that have equal intensities when light having a wavelength equal to the source wavelength is received.

Additional features and advantages of embodiments of the present invention will become more readily apparent from the following description, particularly when taken together with the accompanying drawings.

BRIEF DESCRIPTION OF THE DRAWINGS

FIG. 4A depicts additional aspects of portions of a detector assembly in accordance with embodiments of the present invention;

FIG. 4B is a plan view of a trihedral prism in accordance with embodiments of the present invention;

DETAILED DESCRIPTION

Embodiments of the present invention are generally directed to the measurement of small shifts in optical wavelength. More particularly, embodiments of the present invention allow a Doppler shift experienced by an optical signal reflected from a moving target to be detected and measured, allowing the velocity of the target relative to the measurement instrument to be determined. Furthermore, such measurements can be taken using source signals having short wavelengths, including wavelengths of less than one micrometer.

Figure 1:
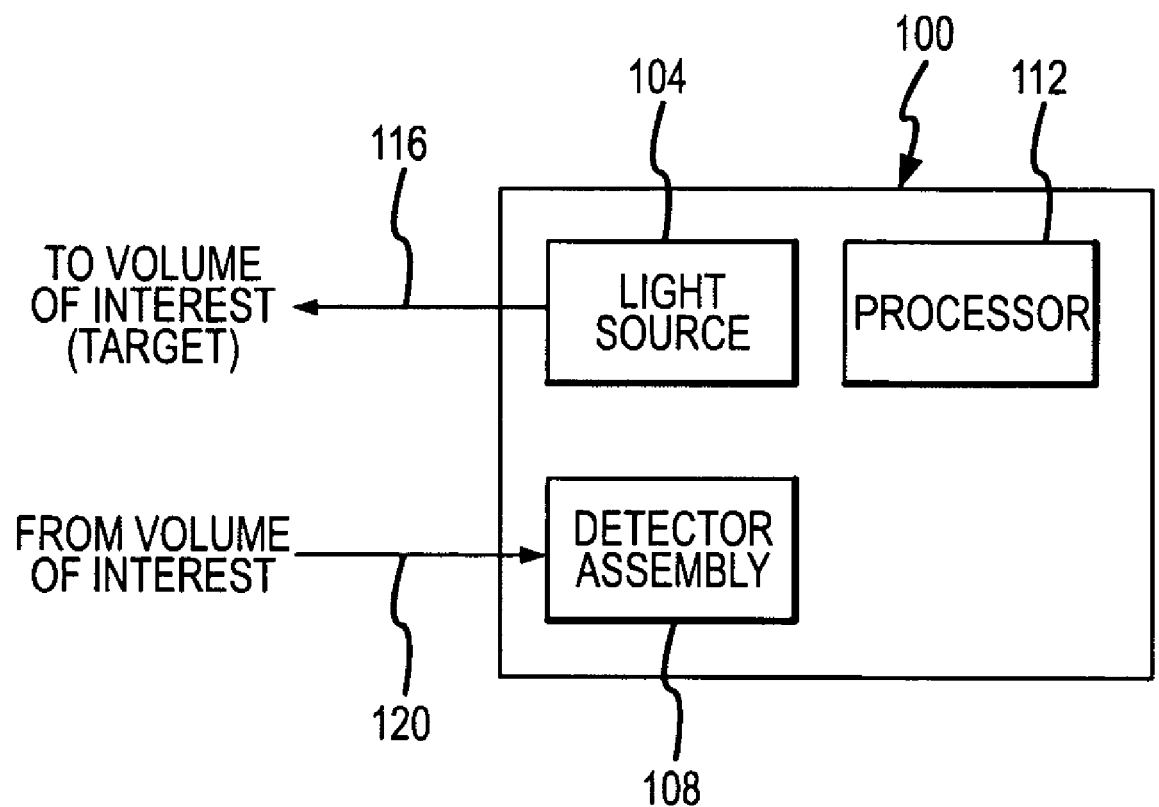
FIG. 1 is a schematic depiction of components of a Doppler lidar in accordance with embodiments of the present invention.

With reference now to FIG. 1, components that may be included in an instrument assembly 100 in accordance with embodiments of the present invention are illustrated. In general, the instrument assembly includes a light source 104 and a detector assembly 108. In addition, the instrument assembly 100 may include a processor 112. As generally depicted in FIG. 1, the light source 104 generates a signal 116 that is directed at or towards a volume of interest or target. For example, the signal 116 from the light source 104 may be directed to a volume of the atmosphere. A reflected or return signal 120 that includes at least some light comprising light from the outgoing signal 116 that has been reflected from the volume of interest is received at the detector assembly 108. The detector assembly determines or detects the frequency shift experienced by the return signal resulting from movement of scatters (e.g. particles and molecules) in the volume of interest relative to the instrument assembly 100. The velocity of the scatters in the volume of interest may then be determined by executing in the processor 112 instructions, as described in greater detail elsewhere herein.

In accordance with embodiments of the present invention, the light source 104 comprises a laser capable of generating a signal 116 having a first wavelength. For example, the wavelength of the signal 116 may be less than about 10 micrometers. In accordance with still other embodiments of the present invention, the wavelength of the signal 116 generated by the light source 104 may be less than about 1 micrometer. Examples of a light source 104 suitable for use in connection with an instrument assembly 100 in accordance with embodiments of the present invention include a single frequency laser. In accordance with further embodiments of the present invention, the light source 104 comprises a laser with a long coherence length. For example, the coherence length of the light source 104 may be at least 0.5 meters, depending on the velocity accuracy desired.

The detector assembly 108 may generally be described as a type of Michelson interferometer. The detector assembly 108 introduces multiple delays with respect to one portion of the received signal 120 as compared to another portion of the received signal 120. The two portions of the received signal 120 are then recombined, and the intensity or amplitude of the signal level provides a measure of the wavelength difference between the wavelengths of the transmitted signal 116 and the received signal 120. Because there can be multiple contributions to the optical signal, and because effects other than wavelength shifts influence the signal level, the ratios of the intensities of the differentially delayed signals after recombination are used to determine the phase shift between the two portions of the return signal 120 that is caused by a Doppler shift of the transmitted signal 116 that has been reflected from the volume of interest.

The processor 112 generally operates to execute instructions controlling the operation of the light source 104 and detector assembly 108. Examples of a processor 112 include a general purpose programmable processor, a controller, or like device. Furthermore, the processor 112 may incorporate supporting componentry, such as memory, long term data storage, communication devices, or other componentry.

In accordance with embodiments of the present invention, the instrument assembly 100 is deployed on a space borne platform. For example, the instrument assembly 100 may comprise or be associated with an Earth orbit satellite or other spacecraft. In accordance with other embodiments of the present invention, the instrument assembly 100 may be associated with other types of vehicles, such as airborne, waterborne or terrestrial vehicles. In accordance with still other embodiments, the instrument assembly 100 may be deployed as part of a stationary installation. As can be appreciated by one of skill in the art after consideration of the disclosure provided herein, the instrument assembly can generally be controlled such that the light source 104 is directed towards the volume of interest and such that the detector assembly 108 receives a return signal comprising transmitted light 116 reflected from the volume of interest.

As can further be appreciated by one of skill in the art, at wavelengths of about 10 micrometers or less, the transmitted signal 116 may be reflected by particles (e.g., aerosols) or molecules that are suspended in the atmosphere.

Figure 2A:
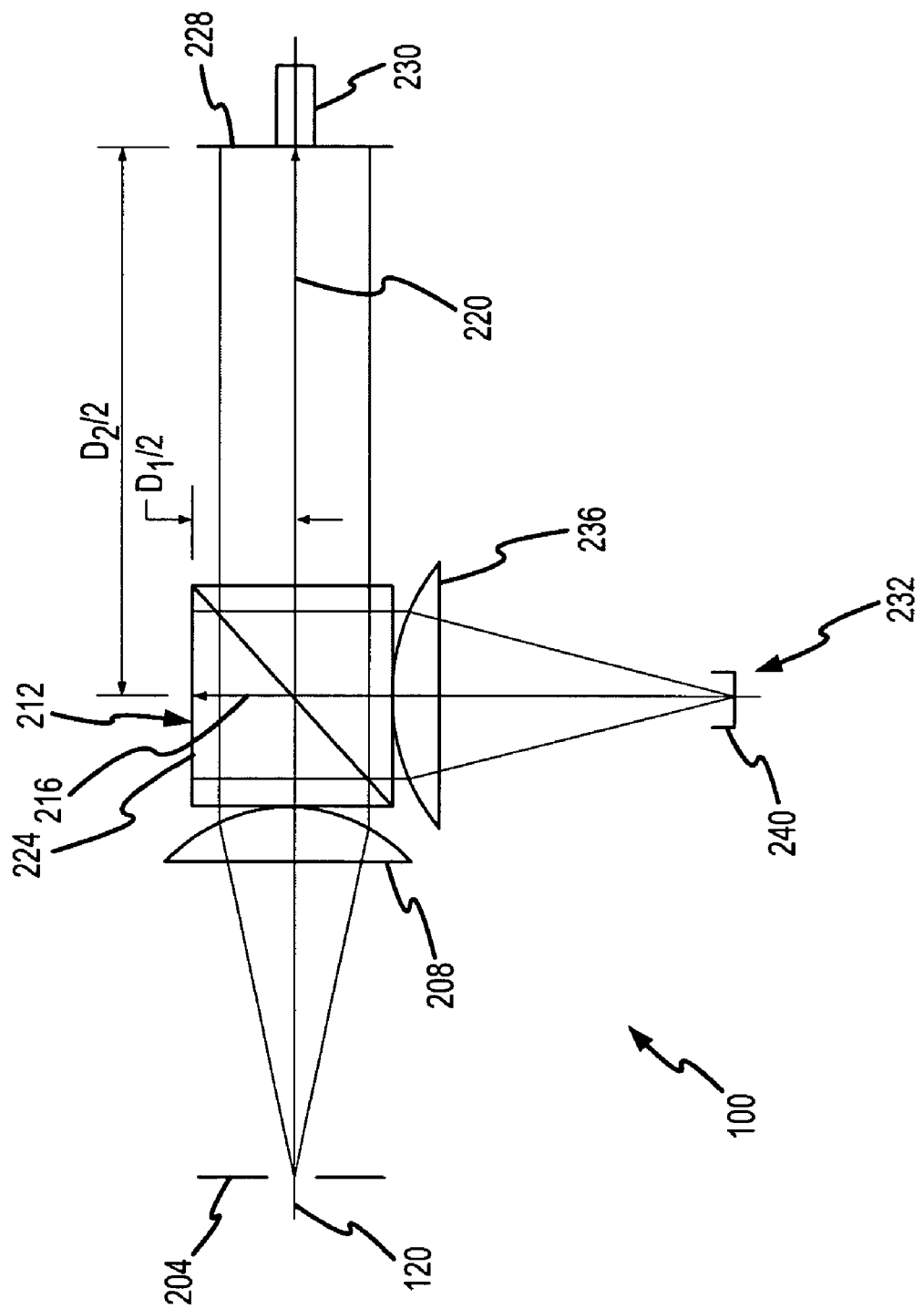
FIG. 2A depicts components of a detector assembly in accordance with embodiments of the present invention.

With reference now to FIG. 2A, components of a detector assembly 108 in accordance with embodiments of the present invention are illustrated. The detector assembly 108 includes a field stop 204 through which the received return signal 120 is passed. A lens 208 directs the return signal 120 to a beam splitter 212. Although not shown in FIG. 2A, it should be appreciated that the detector assembly 108 may include additional or alternative optical components for collecting and directing the received return signal 120.

The beam splitter 212 divides the received return signal 120 into first 216 and second 220 optical paths, thereby forming first and second beams. Light directed along the first optical path 216 is reflected back through the beam splitter 212 by a first mirror 224. The length of the first optical path 216, from the center of the beam splitter 212, is given as $D_1$, which is twice the average distance of the first mirror 224 from the center of the beam splitter 212. The portion of the received return signal 120 directed along the second optical path 220 is reflected back to the beam splitter 212 by a second mirror 228. The average distance of the second mirror 228 from the center of the beam splitter 212 is given as $D_2/2$. This distance $D_2/2$ may be adjusted or fine tuned by a piezoelectric transducer or other device 230 for moving the mirror 228. Moreover, a device 230 for moving the second mirror is not required. As described in greater detail elsewhere herein, in accordance with embodiments of the present invention, the second mirror 228 is stepped to provide slightly different periods of delay with respect to different portions or segments of the light directed along the second optical path 220. Accordingly, the detector assembly 108 can provide a number of interferometric path differences.

The portions of the received return signal 120 reflected by the first 224 and second 228 mirrors are recombined in the beam splitter 212 and directed towards a sensor assembly 232 by detector optics 236. The sensor assembly 232 may comprise various types of devices or detector elements 240 suitable for detecting the intensity of a received interference pattern or patterns. For example, a detector 240 provided as part of a sensor assembly 232 may comprise a photo imaging chip, such as a charge coupled device (CCD), or a number of single cell devices.

Figure 3B:
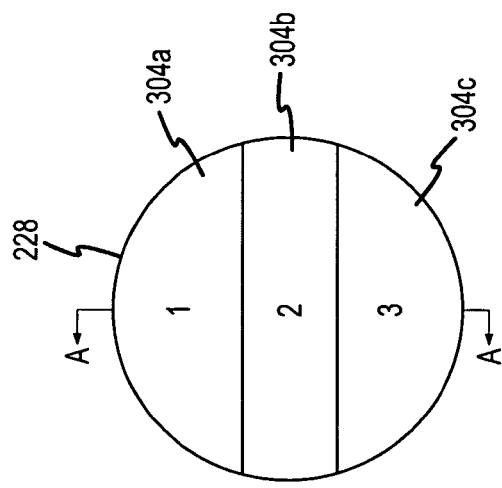
FIGS. 3A-3B depict in plan view arrangements for dividing a received signal into multiple, differentially delayed segments.
Figure 3D:
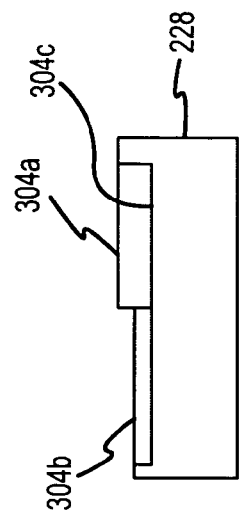
FIGS. 3C-3D depict in elevation arrangements for dividing a received signal into multiple differentially delayed segments.
Figure 3A:
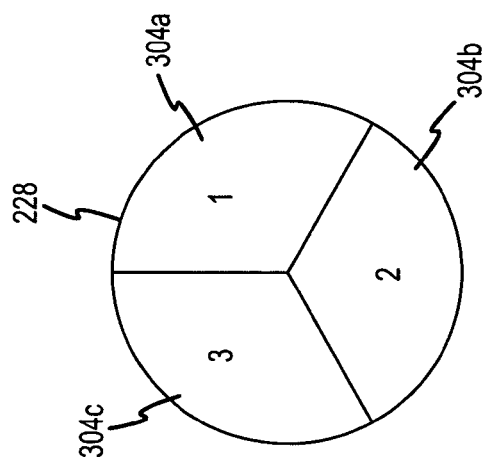
Figure 3C:
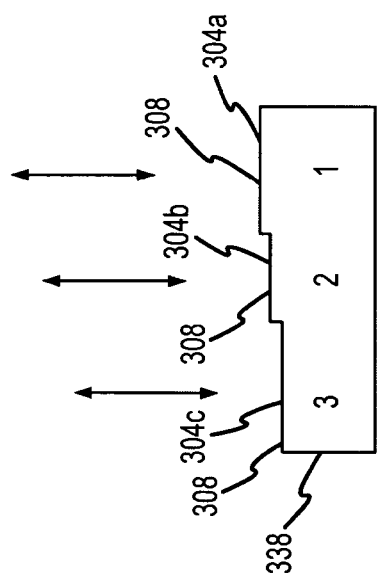

With reference now to FIGS. 3A-3C, views of a second mirror 228 in accordance with embodiments of the present invention are illustrated. In particular, FIG. 3A shows a second mirror 228 in plan view, having a number of subdivisions 304a-c for each of the different delay paths. More particularly, the second mirror 228 in FIG. 3A is divided into a number of pie shaped segments having equal areas. With reference now to FIG. 3B, a second mirror 228 having a layered arrangement of mirror segments 304a-c is illustrated. The second mirrors 228 in FIGS. 3A and 3B are examples of second mirrors 228 that can be used in connection with a second optical path 220 in which aperture division is used to divide the signal in the second optical path 220 into differentially delayed segments.

With reference now to FIGS. 3C and 3D, the secondary mirrors 228 of FIGS. 3A and 3B, respectively, are depicted in elevation. As seen in FIG. 3C, each mirror segment 304a, 304b, and 304c comprises a planar reflective surface 308a-c that is generally parallel to the planar reflective surfaces of 308a-c of the other mirror segments 304a-c. Accordingly, small differences in path length for light comprising the different segments, and therefore slightly different delays, can be obtained. More particularly, the reflective surfaces 308 of the mirror segments 304 may each define planes that are separated from one another by a distance equal to one-eighth of the wavelength of the transmitted signal 116 of the instrument assembly 100. In accordance with embodiments of the present invention, a secondary mirror's segments 304 may be formed using thin film deposition techniques.

Figure 2B:
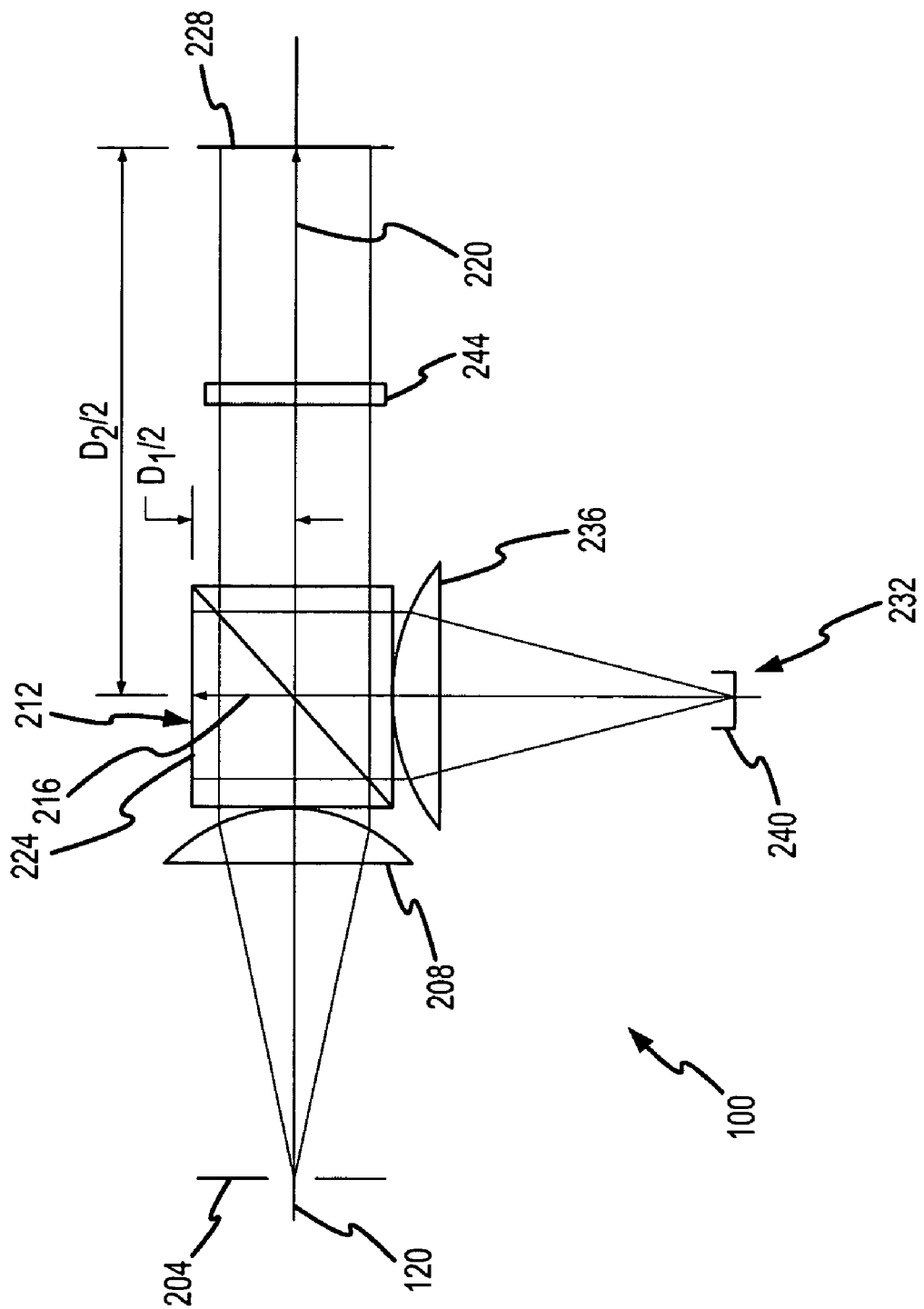
FIG. 2B depicts components of a detector assembly in accordance with other embodiments of the present invention.

With reference now to FIG. 2B, components of a detector assembly 108 in accordance with other embodiments of the present invention are illustrated. The detector assembly 108 illustrated in FIG. 2B differs from the assembly illustrated in FIG. 2A, in that the detector assembly 108 in FIG. 2B does not feature a stepped second mirror 228. Instead, slightly different periods of delay with respect to different portions or segments of the light directed along the second optical path 220 are introduced by a phase retarder 244. The phase retarder 244 introduces the different periods of delay by interposing a material having an index of refraction that is different than the index of refraction of the medium through which the light directed along the second optical path 220 otherwise travels through. For example, the phase retarder 244 may comprise a disk of glass having pie shaped segments of different thicknesses, such that the portions of the light directed along the second optical path 220 are differentially delayed. As a further example, the phase retarder 244 may be formed from different pieces of material having different indices of refraction and/or different thicknesses to introduce the different delays. In general, any configuration of phase retarder 244 can be used, provided it is capable of introducing at least three closely separated differential delays as described herein. In particular, the phase retarder 244 should, with respect to a first portion or segment of the light directed along the second path 220 that is delayed by an amount d1, delay a second portion or segment of the light directed along the second path 220 by an amount d2 that is equal to d1 plus one-quarter of the wavelength of the transmitted signal 116 of the instrument assembly 100, and delay a third portion or segment of the light directed along the second path 220 by an amount d3 that is equal to d2 plus one-quarter of the wavelength of the transmitted signal 116, as described in greater detail elsewhere herein.

With reference now to FIG. 4, a sensor assembly 232 comprising a number of detector elements 240 and an associated detector optical system 236 are illustrated. Rays 408 comprising an interference signal obtained by combining the light from the first optical path 216 with the differentially delayed light from the second optical path 220 after interference is received as a stepped wavefront 412 by the detector optical assembly 236. A first component of the detector optical assembly 236 may comprise a trihedral prism 416. The trihedral prism 416 has three areas 420a-c (see FIG. 4B) corresponding to the rays 408 of the interference signal created in connection with the three differently delayed segments, and therefore corresponding to the steps 422a-c of the stepped wavefront 412. With continued reference to FIG. 4A, the rays 408 of the interference signal are passed from the trihedral prism 416 to a lens 424, which cooperates with the trihedral prism 416 to divide the rays 408 of the interference signal into ray groups 428a-c corresponding to the different signal delays, such that each of the segmented ray groups 428 is incident on a corresponding detector 240a-c. Accordingly, it can be appreciated that embodiments of the present invention can provide a detector assembly 108 that is capable of making simultaneous measurements of intensity (using the detectors 240a-c) at closely spaced intervals along the waveform of an interference signal.

Figure 5:
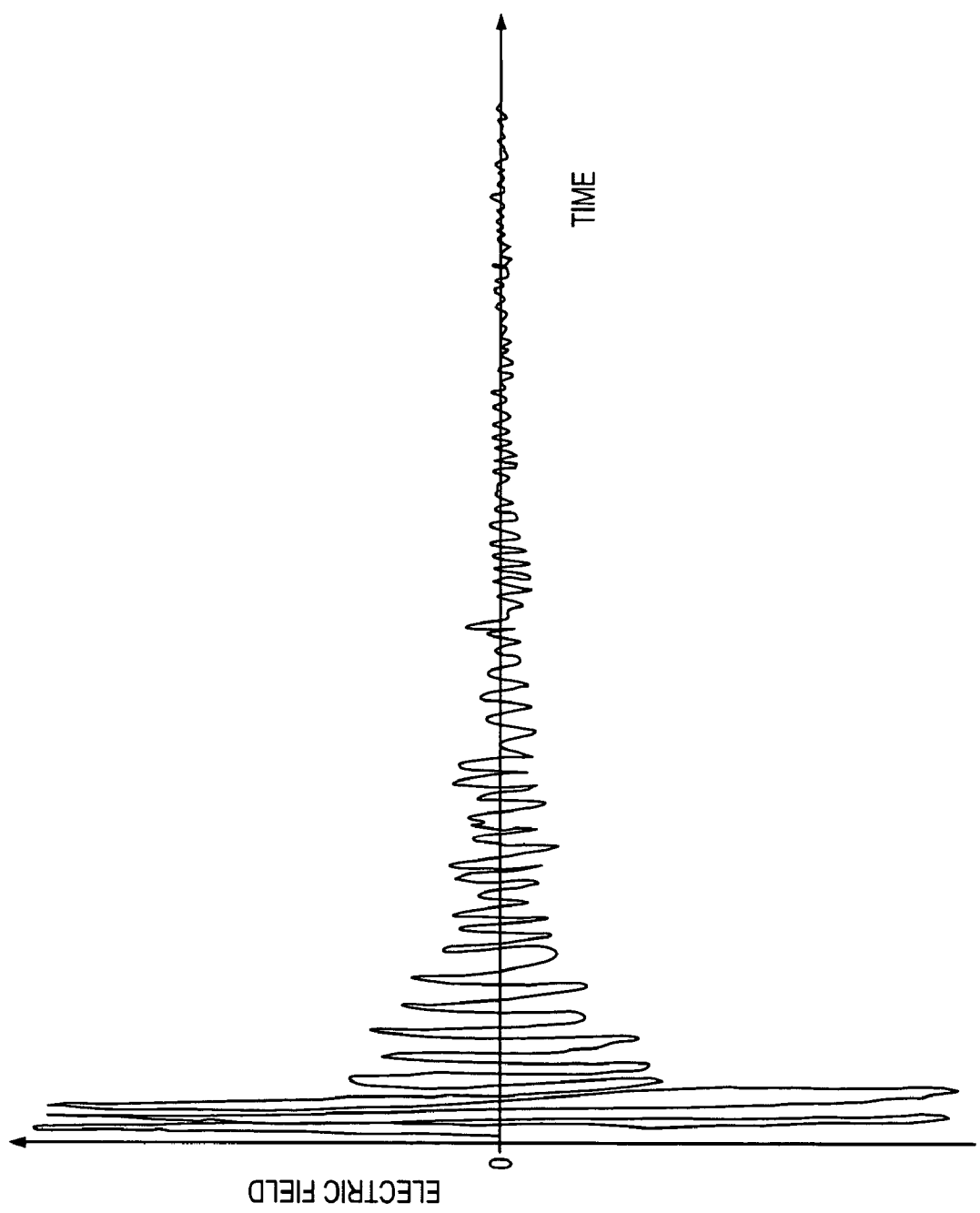
FIG. 5 depicts an example of the electrical field of a return optical signal over time.

With reference now to FIG. 5, the electric field of an optical signal as a function of time is schematically illustrated. In general, the frequency $v=c/\lambda$, where c is the speed of light and $\lambda$ is the wavelength. For example, the frequency of a signal having a wavelength of 1.06 micrometers is approximately $2.83 \times 10^{14}$ Hz. At present, there is no electronic way to measure this frequency directly. In addition, the amplitude of the scattered optical signal varies greatly due to various effects. For example, it falls off as $t^2$ because of the increasing distance of the target from the receiver as the optical pulse travels outward from the transmitter. It also varies as the concentration of particles and molecules in the target volume changes. The large initial spike in FIG. 5 is internal scattering in the system, and lasts approximately 20 nanoseconds in typical applications. Background noise fluctuates, but is roughly constant. The phase of the electric field varies randomly when the scattering from multiple particles is added. However, it is coherent over much less than one microsecond for a typical atmospheric applications at a wavelength of 1.06 micrometers. Backscatter from the atmosphere is often detectable for 200 microseconds or longer, depending on the application.

Figure 6:
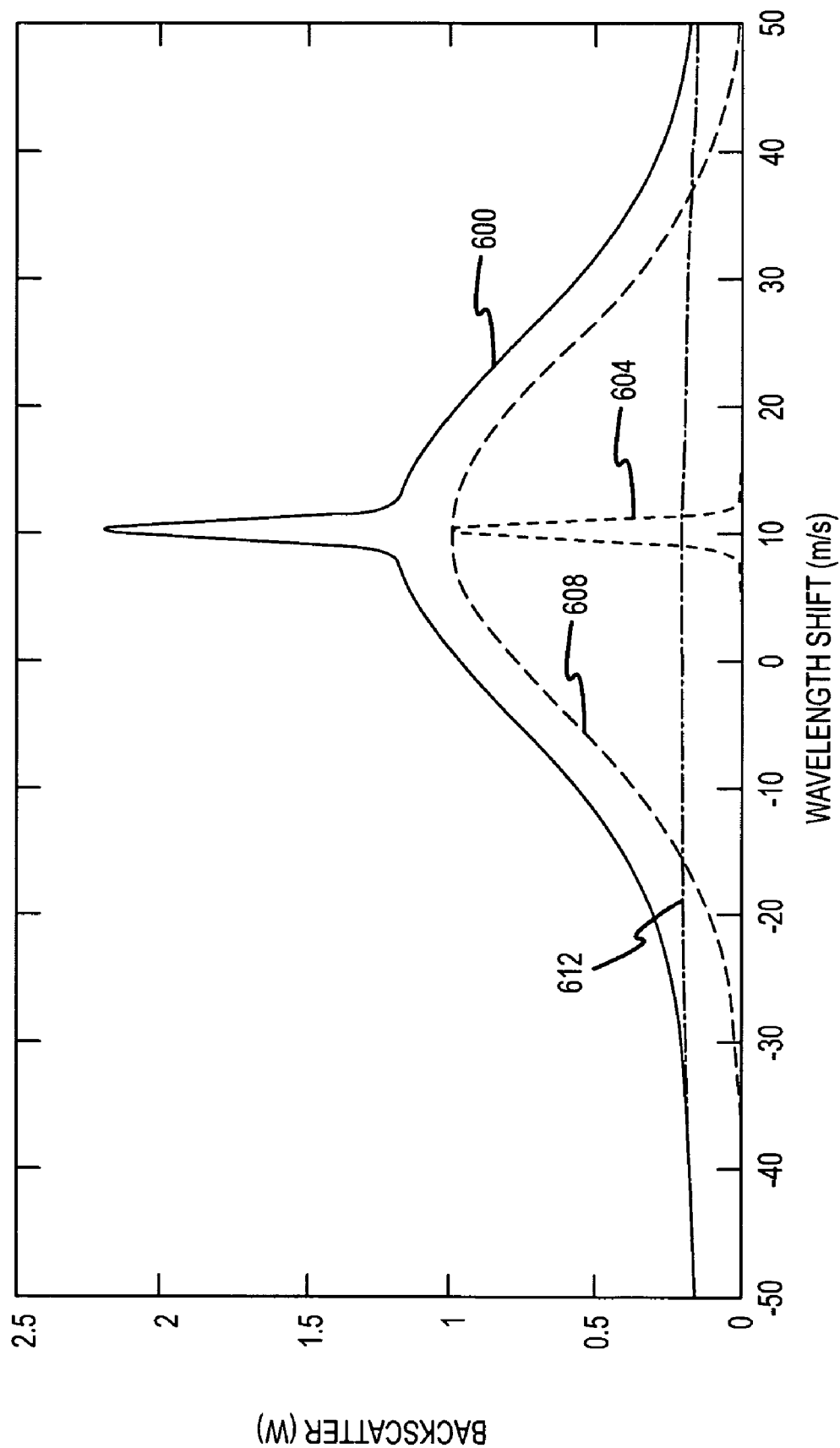
FIG. 6 depicts the principal frequency components in an exemplary return signal.

With reference now to FIG. 6, the principal frequency components in a typical return signal are illustrated. More particularly, the energy of the return signal at different wavelength shifts (corresponding to different frequencies) is illustrated. Specifically, the combined backscatter signal 600 is shown. Also shown is the aerosol spectrum 604 component of the combined backscatter 600. The aerosol spectrum 604 is shifted due to the mean wind within the volume from which the backscatter signal 600 was obtained. In the present example, the wavelength shift corresponds to a mean wind speed of 10 meters per second in a direction away from the instrument assembly 100. The molecular spectrum 608 component of the combined backscatter 600 is also illustrated. As can be appreciated by one of skill in the art, the width of the molecular spectrum 608 depends on the Brownian motion of molecules. The molecular spectrum 608 is also shifted, again due to the mean wind speed within the target volume relative to the instrument assembly 104. The width of the aerosol spectrum 604 depends on the laser line width associated with the light source 104 and inhomogeneities in the velocities of the particles within the sample volume caused by turbulence and shear. The background light 612 component of the backscatter signal 600 is not shifted by wind speed at the target volume. The width of the background light spectrum 612 depends on the blocking prefilter. Although the shapes of the various spectral components 604 to 612 and the combined backscatter signal 600 illustrated in FIG. 6 is typical, it should be appreciated that it is provided for exemplary purposes only. Furthermore, it can be appreciated that various factors, including laser wavelength and changes in atmospheric properties (for example with altitude), can change the relative amplitudes of components of the backscatter signal 600.

Figure 7:
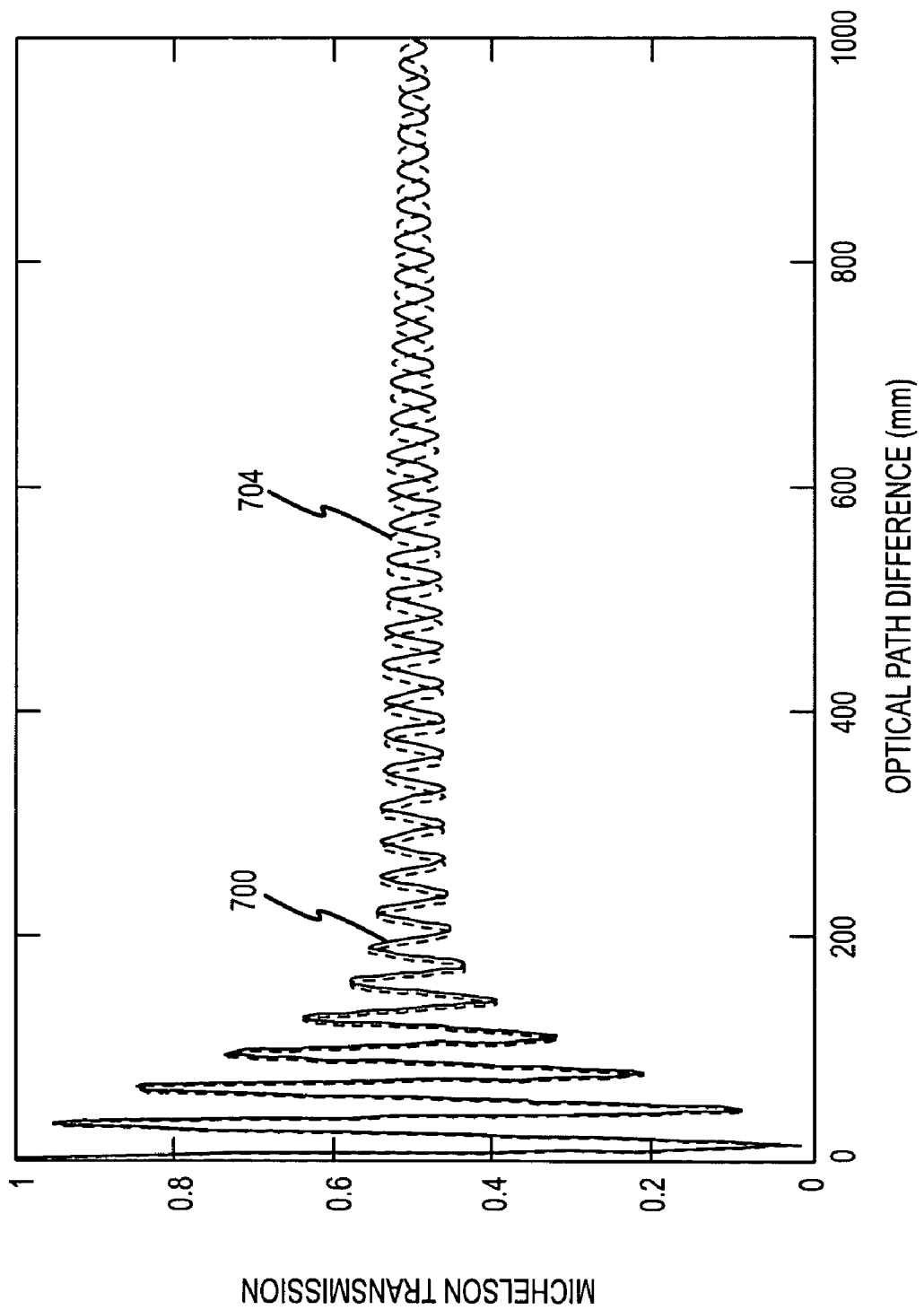
FIG. 7 depicts the transmission characteristics of an embodiment of the present invention over optical path length difference.

With reference now to FIG. 7, an example interferogram is shown. In particular, an interferogram of transmitted light 700 (shown as a solid line in FIG. 7) is juxtaposed with an interferogram of Doppler-shifted scattered light 704 (shown as a dotted line in FIG. 7). In particular, it can be appreciated that the difference between the transmitted light interferogram 700 and the interferogram of the Doppler-shifted scattered light 704 increases with increasing delay. For instance, for the example schematic conditions illustrated in FIG. 7, the phase shift is about $\pi$ at a delay of about 800 mm. In addition, it can be seen that the amplitude of the interferogram 700, 704 decays rapidly. This rapid decay is due to broader molecular scattering. With increasing optical path difference (i.e., at the tail of the interferogram), the decay and amplitude is slow due to narrower aerosol scattering. Accordingly, FIG. 7 illustrates that there is a trade-off between total delay, with greater delay providing greater sensitivity, and modulation depth or signal-to-noise ratio, with lesser delays providing greater modulation depth.

Figure 8:
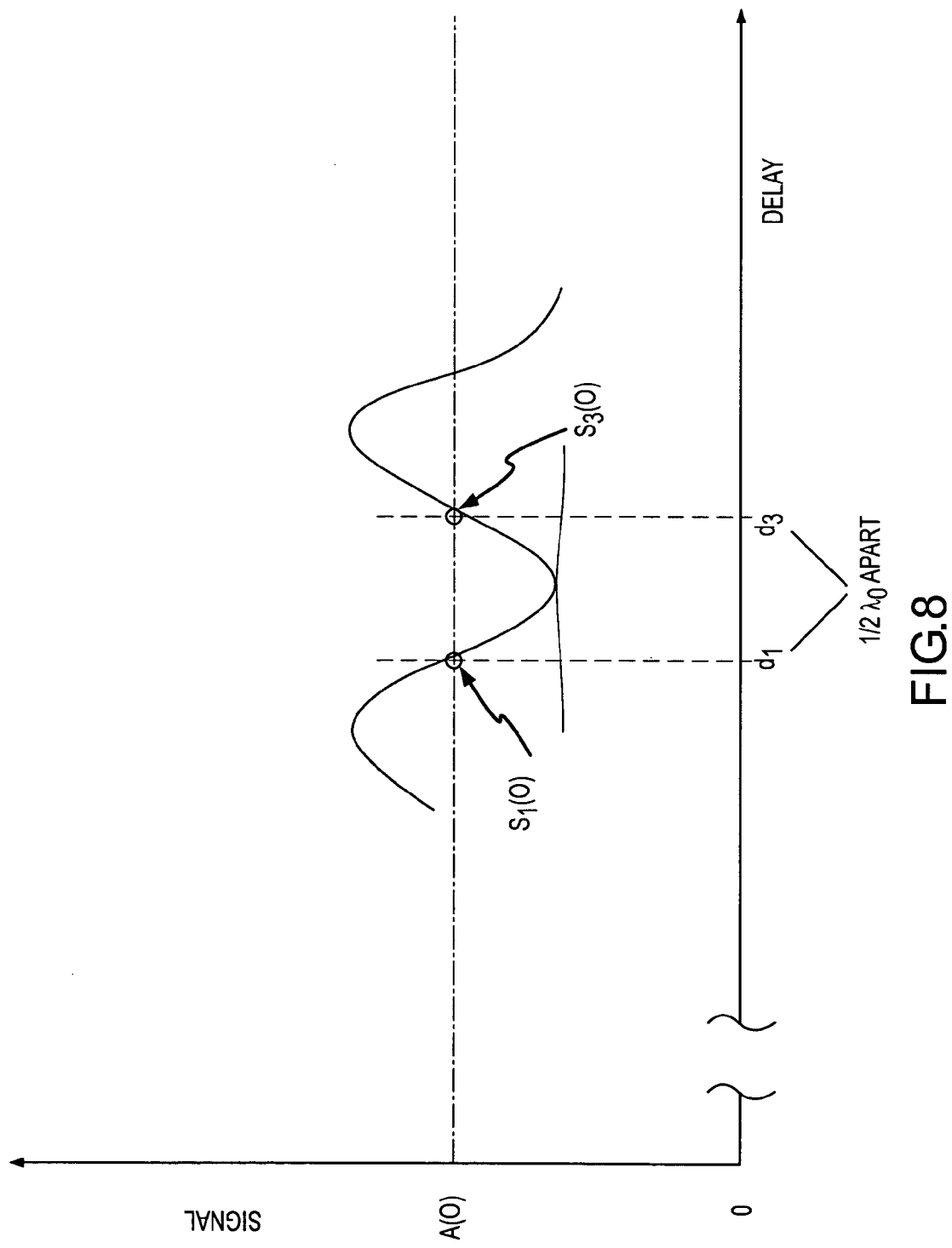
FIG. 8 depicts the calibration of delays in accordance with embodiments of the present invention.

With reference now to FIG. 8, a greatly expanded section of the interferogram is shown at time t=0, i.e., when the laser pulse is transmitted. The interferometer is adjusted with two delays d1 and d3, which are fixed at $\lambda/2$ (i.e., a half wave) apart. If the time dependent signals $S_1$ (0) and $S_3$ (0) are equal, then the interferometer is correctly set. If they are not equal, then d1 and d3 are adjusted together to make them equal. In this way, changes in laser transmitter wavelength and interferometer pathlength are corrected for automatically. In accordance with embodiments of the present invention, such an adjustment can be made by adjusting the distance between the second mirror 228 and the beam splitter 212 using a piezoelectric transducer 230 or other device capable of moving the second mirror 228 (see FIG. 2A). The adjustment in FIG. 8 is not required for correct operation of an embodiment of the invention, but is included to help in understanding the measurement technique that is part of the present invention.

Figure 9:
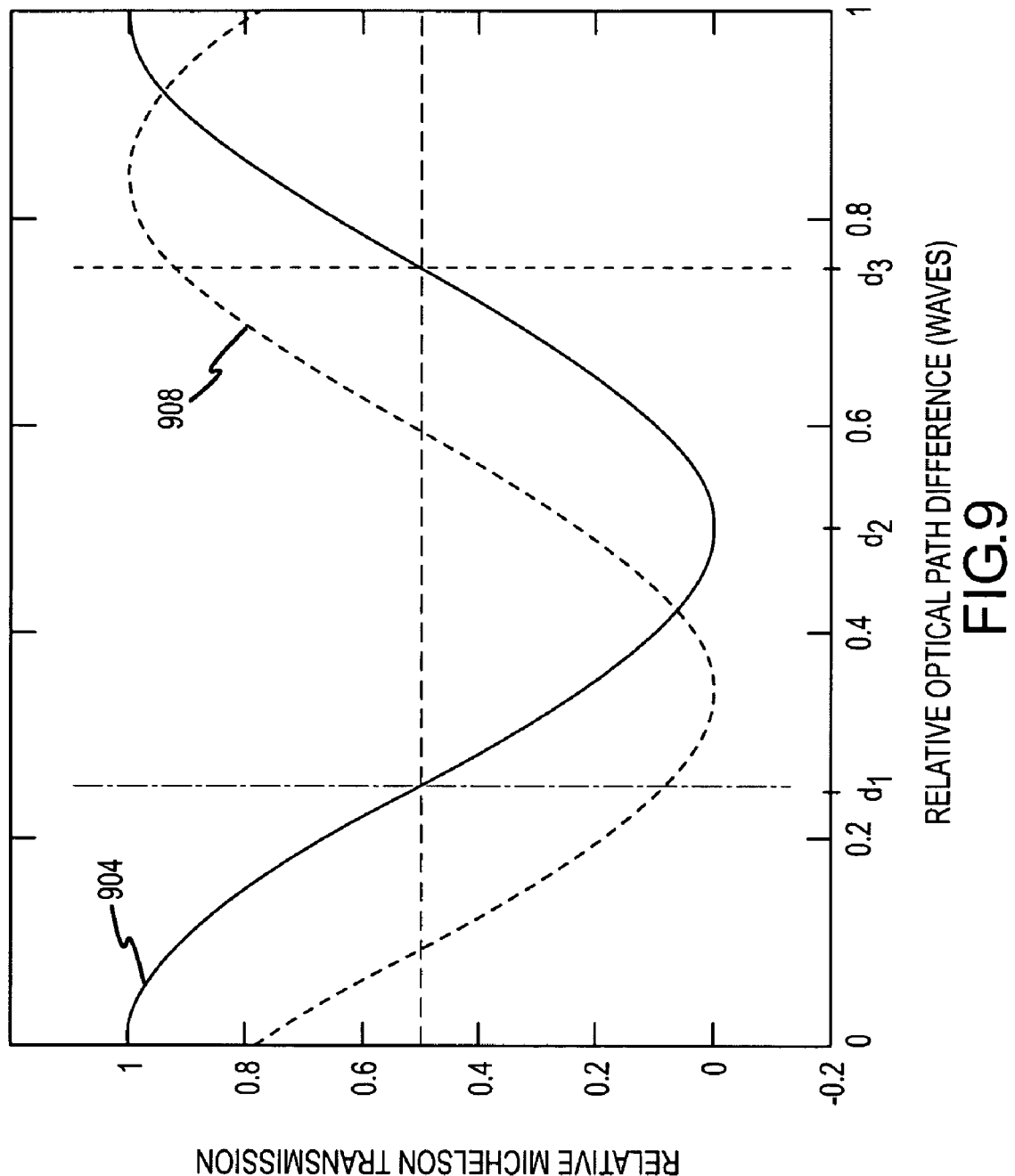
FIG. 9 depicts relative optical path differences of received optical signals having different wavelengths and associated detected intensities in accordance with embodiments of the present invention.

With reference now to FIG. 9, the relative optical path difference between a reference wave 904 (part of the reference interferogram) and a phase shifted wave 908 is shown. As shown, at delays d1, d2, and d3, different signal amplitudes are obtained for the shifted wave as compared to the reference wave. This shifting of the received wave is extremely small in terms of wavelength shift. However, the difference in comparative phase shift is more easily discerned. Furthermore, by measuring the intensity of the phase shifted wave 908 at the three different delays d1, d2 and d3 simultaneously, the shift in wavelength experienced by the received signal can be measured.

Figure 10:
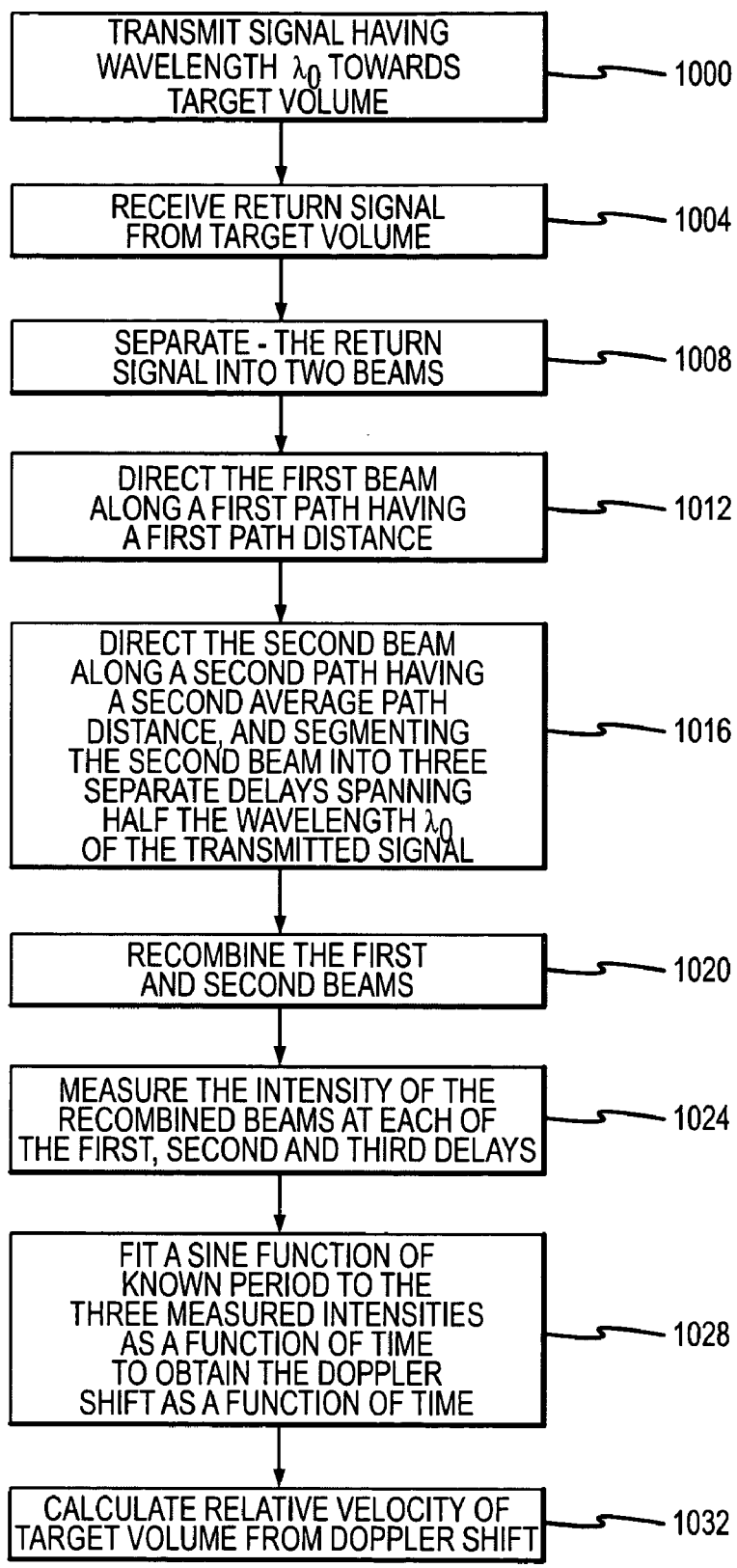
FIG. 10 is a flowchart depicting aspects of a method for measuring small shifts in wavelength in accordance with embodiments of the present invention.

With reference now to FIG. 10, a process for measuring small shifts in optical wavelength in accordance with embodiments of the present invention is illustrated. In particular, aspects of a process that may be applied in connection with measuring wind speed within a target volume are illustrated. Initially, at step 1000, a signal having a wavelength $\lambda_0$ is transmitted and directed towards a target volume. In accordance with embodiments of the present invention, transmitting a signal may comprise generating a laser beam having a coherence length of 0.5 meters or more. Furthermore, the transmitted signal may have a wavelength from about 10 micrometers to about 0.25 micrometers. Additionally, directing a signal towards the target volume may comprise pointing the light source independently of an associated vehicle or mounting structure, or pointing the vehicle or components of the structure.

At step 1004, a return signal is received from the target volume. Receiving the return signal may comprise allowing light to enter a detection portion of an instrument through a field stop. In addition, the detector assembly 108 may include filters to remove background radiation from the return signal. The return signal may then be separated into two beams (step 1008). In accordance with embodiments of the present invention, separating a return signal may comprise separating that signal using a beam splitter 224. A first beam of the return signal is directed along a first path having a first path distance (step 1012). The second beam is directed along a second path having a second average path distance. Furthermore, the second beam is segmented into three separate delays spanning one-half the wavelength $\lambda_0$ of the transmitted signal (step 1016). In accordance with embodiments of the present invention, segmenting the second beam into three separate delays may comprise providing a mirror at one end of the beam path having three separate step surfaces. Furthermore, each of the step surfaces may have an equal area. In addition, the step surfaces may be parallel to one another and separated from one another by a distance equal to $\lambda_0/8$, such that each delay in the reflected signal is separated from a neighboring delay by a distance equal to $\lambda_0/4$, and so that the delays span a distance equal to $\lambda_0/2$.

At step 1020, the first and second beams are recombined. In accordance with embodiments of the present invention, recombining the first and second beams may comprise passing those beams back through a beam splitter 224. The intensity of the recombined beams at each of the first, second and third delays is then measured (step 1024). Measuring the intensity of the recombined beams at each of the first, second and third delays may comprise simultaneously measuring the intensity or power of three different areas corresponding to the mixing of the first beam with the three segments of the second beam. Furthermore, the intensity measurement may be performed using a charged coupled device or other multiple cell detector capable of providing a separate intensity measurement for each of the three areas of the recombined beam. In accordance with still other embodiments of the present invention, each of the three areas of the recombined beams may be associated with a detector. Furthermore, such a detector may include a single cell detector. In accordance with still other embodiments of the present invention, the three areas of the recombined beam may be spatially separated from one another and directed to a detector.

At step 1028, a sine function of known period is fitted to the three measured intensities as a function of time to obtain the Doppler shift of the return signal as compared to the transmitted signal as a function of time. For example, the average power or intensity of the return signal may be calculated from the intensity measured with respect to the shortest delay and the intensity measured with respect to the longest delay.

The measurement of the intensity at each of the first, second and third delays is performed simultaneously, at a time equal to the travel time out to and back from the target volume. Because the three delays are fixed at $\lambda_0/4$ (i.e., a quarter wave apart from the preceding delay), a sine function of known amplitude, phase and offset (i.e., three unknowns) can be fitted uniquely to the three data points to obtain the Doppler shift. An outline of this procedure follows. If the return signal at time t is divided into two equal parts and recombined after delaying one part by a path difference d, the resulting intensity in the interferogram (FIG. 7), I(d), is: $I(d)=A(t)[1+E(d)\cos(2\pi D/\lambda)]$, where A(t) is an amplitude factor depending on range and atmospheric scattering and E(d) is an envelope function for the interferogram, which depends on the width of the components of the frequency spectrum and shows how fast the interference decays with increasing path difference. Taking the derivative of $I(d,\lambda)$ with respect to $\lambda$ with d fixed, the following is obtained: $\delta I/\delta\lambda=[A(t)E(d)2\pi d/\lambda^2]\sin(2\pi d/\lambda)$. Because $\lambda$ is very close to $\lambda_0$, $\lambda_0$ can be used for $\lambda$ in the multiplying factor, but not in the argument of the sine function. A change in $I(d,\lambda)$ for a change in wavelength $\lambda$ is maximum when the sine factor is 1, that is, when $2\pi d/\lambda$ is some odd integer times $\pi/4$. The intensity at a fixed delay will then change, depending on the change in wavelength of the signal. Accordingly, by measuring the intensity of the interference signal at three different delays, three data points are obtained that can be used in connection with the three unknowns of the equation for the derivative of the interferogram.

For illustration of step 1028, assume the relation of wavelength and phase given in FIG. 8 for the unshifted (transmitted) light, although this is not necessary in practice. Let $S_1$, $S_2$, and $S_3$ be the three time-dependent signals at the three fixed optical delays. Then A(t) is simply $[S_1(t)+S_3(t)]/2$. In the limit, $\delta\lambda=0$, the value of the envelope function at the given delay is $E(d,t)=A(t)-S_2(t)$. In the general wavelength-shifted case where the conditions of FIG. 8 do not hold, E(d,t) is obtained from the sine fitting procedure.

The relative velocity of the target volume can then be calculated from the measured Doppler shift (step 1032). In particular, the Doppler shift in wavelength for a backscatter lidar sensing scattering centers moving with the velocity component V along a beam, away from the lidar, is $\delta\lambda=2\lambda_0 V/c$, where the factor 2 accounts for the backscatter geometry. As is apparent from the foregoing equation, if $\delta\lambda$ is known, then V, the relative velocity of the scatters within the target volume, is known. To estimate the required delay, a velocity range to be detected that results in a change in normalized intensity of ±0.5 is chosen to occur. For example, if a velocity range of ±20 meters per second is selected, a distance of 0.63 meters is obtained. By increasing the path distance the sensitivity of the measurement to changes in wavelength is increased, however, the full scale range of the instrument is reduced.

Figure 11:
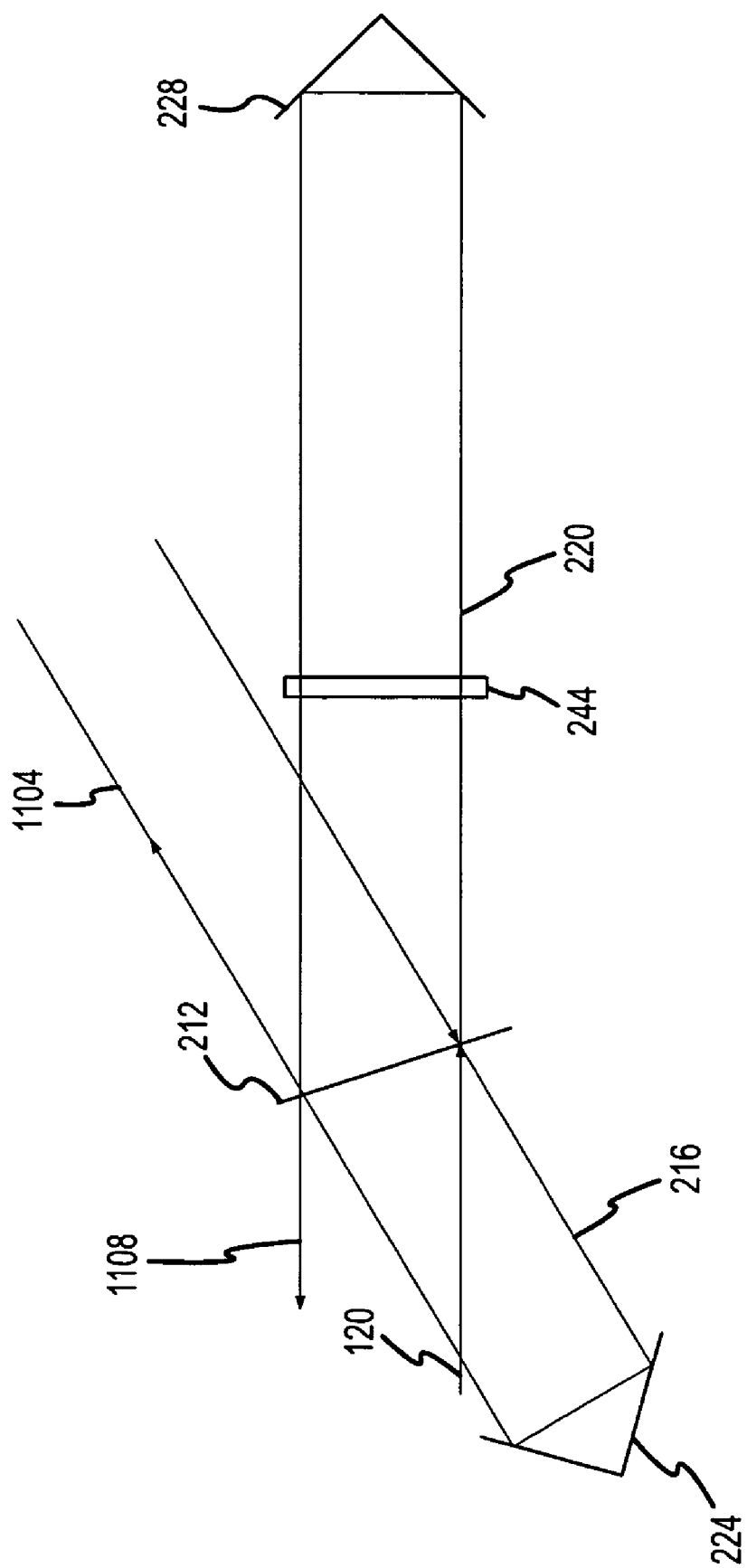
FIG. 11 illustrates components of a detector assembly in accordance with other embodiments of the present invention.

With reference now to FIG. 11, components of a detector assembly 108 in accordance with other embodiments of the present invention are illustrated. In particular, a beam splitter 212 is provided at an angle to the received return signal 120 such that the first optical path 216 and the second optical path 220 are in a non-orthogonal relationship to one another. In addition, the first mirror 224 and the second mirror 228 of the embodiment illustrated in FIG. 11 comprise trihedral mirrors to provide spatial separation between the incoming signal and the outgoing signal. A phase retarder 244 may be used to introduce the three differential delays in order to make measurements as described herein. The intensity measurements may be made using detectors along the primary output path 1104 (or alternatively along the secondary output path 1108, or both paths). As can be appreciated by one of skill in the art, such an arrangement can increase the efficiency of the interferometer by reducing the amount of light that would otherwise be lost through reflection out the front of the instrument.

Figure 12:
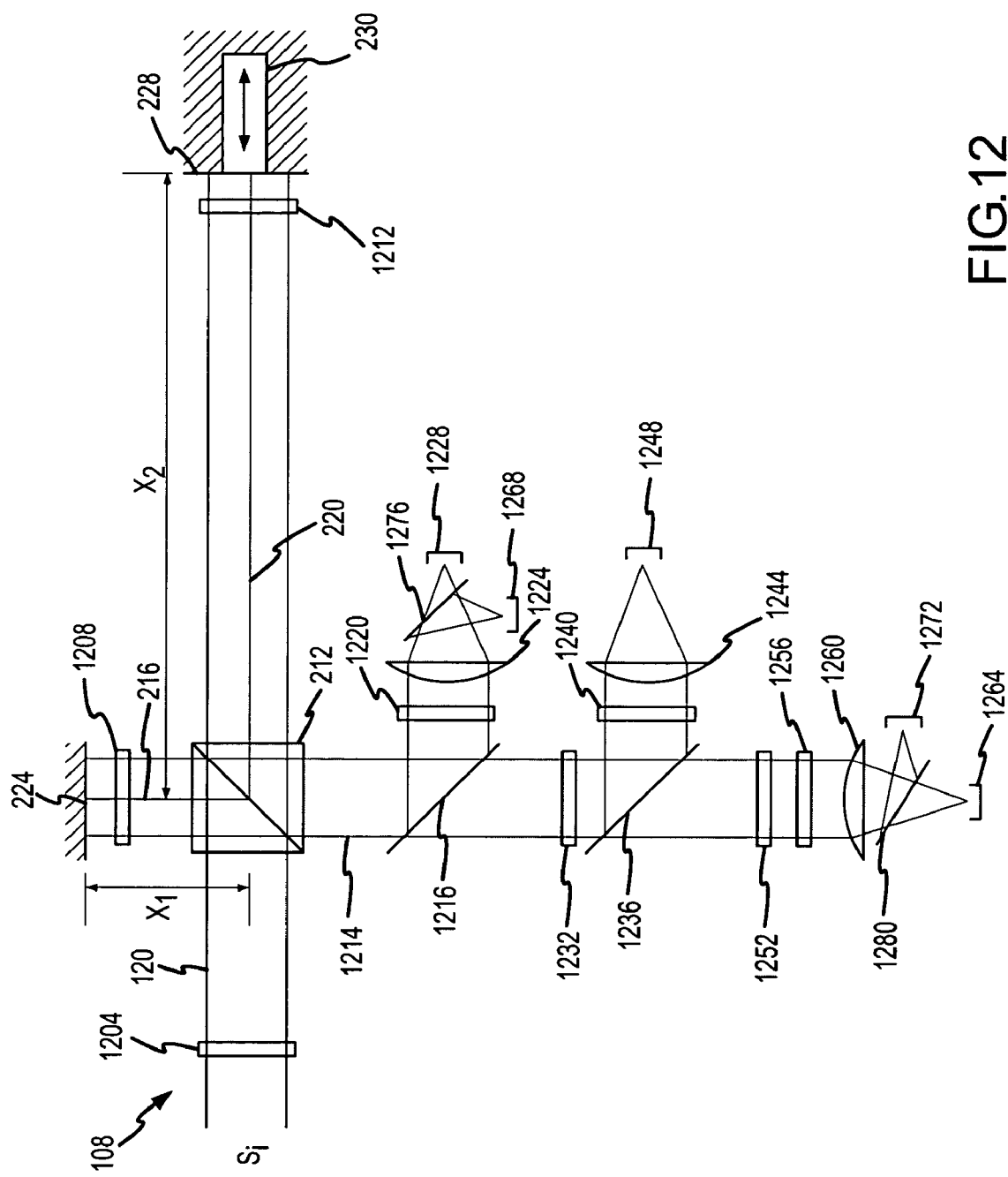
FIG. 12 depicts components of a detector assembly in accordance with still other embodiments of the present invention.

FIG. 12 illustrates a detector assembly 108 in accordance with still other embodiments of the present invention. In particular, FIG. 12 illustrates the use of wavefront division to introduce three separately detectable delays in a received signal. According to such embodiments, the received signal 120 is linearly polarized, and is aligned at an angle of 45° to the plane of incidence of a beam splitter 212. As can be appreciated by one of skill in the art, such linear polarization can be introduced using a polarizing filter 1204. The received signal 120 is divided by the beam splitter 212 comprising a polarizing beam splitter. Accordingly, light directed along a first optical path 216 is orthogonally polarized with respect to light directed along a second optical path 220. Furthermore, one of skill in the art can appreciate that by providing a linearly polarized received signal 120 that is at 45° with respect to the polarizing beam splitter 212, the intensity of the two orthogonally polarized beams formed by the polarizing beam splitter 212 will be equal.

A first quarter waveplate 1208 is placed across the first optical path 216, such that light reflected by a first mirror 224 will be transmitted by the polarizing beam splitter 212. Similarly, a second quarter wave plate 1212 is placed across the second optical path 220 such that light reflected by a second mirror 228 will be reflected by the polarizing beam splitter 212. Accordingly, the light comprising a first beam that has traveled down the first optical path 216 and been reflected by the first mirror 224 and the light comprising the second beam that has traveled down the second optical path 220 and been reflected by the second mirror 228, at the polarizing beam splitter 212 is directed along a third optical path 1214. However, the beam that traveled along the first path 216 (beam 1) remains orthogonally polarized with respect to the beam that traveled along the second path 220 (beam 2). A first beam splitter 1216 samples approximately one-third of each orthogonally polarized beam and directs it through a first polarization scrambler 1220, which mixes the polarizations of the two beams so that they can interfere. The mixed (and now interfering) beams are then directed by a lens 1224 to a first detector 1228.

The portions of the first and second beams that are passed by the first beam splitter 1216 remain orthogonally polarized, and are passed through a first delay quarter wave plate 1232, which adds an additional relative delay of $\lambda/4$ to beam 2 with respect to beam 1. Approximately half of each remaining beam is directed by a second beam splitter 1236 through a second polarization scrambler 1240 so that the first beam can interfere with the additionally delayed second beam. The combined signal is directed by a lens 1244 to a detector 1248.

The remaining portions of the first and second beams passed by the second beam splitter 1236 remain orthogonally polarized, and are passed through a third quarter wave plate 1252, which is configured to delay the portion of the light from the second path 220 by an additional $\lambda/4$ (i.e. after passing through the third quarter wave plate 1252 beam 2 has been delayed by $\lambda/2$ with respect to beam 1). The remaining portions of the two beams are combined with one another in a third polarization scrambler 1256, allowing the two signals to interfere. The combined signals are then directed by a lens 1262, to a third detector 1264. The intensities of the signals, as determined by the detectors 1228, 1248 and 1264, can then be used to determine the Doppler shift experienced by the return signal 120, as described elsewhere herein.

Embodiments of the present invention may also include first 1268 and second 1272 auxiliary detectors associated with the first and third delays respectively. If provided, the auxiliary detectors 1268, 1272 are provided with a small percentage of the energy in the beams that have passed through the polarization scramblers 1220, 1256 respectively by partial reflectors 1276 and 1280. The auxiliary detectors 1268, 1272 are useful in calibrating the detector assembly 108 to the light source 104. In particular, light from the light source 104 may be directed to the detector assembly 108, and the spacing between the second mirror 228 and the beam splitter 212 may be adjusted by a piezoelectric or other device 230 until the auxiliary detectors 1268, 1272 detect light of equal intensity. As can be appreciated by one of skill in the art, the use of auxiliary detectors 1268, 1272 and partial reflectors 1276, 1280 can effectively extend the dynamic range of the detector assembly 108 to read the relatively strong signal obtained when light from the light source 104 is directed to the detector assembly 108, without first reflecting that light off of particles and/or molecules in a target volume in the atmosphere.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with the various modifications required by their particular application or use of the invention. It is intended that the appended claims be construed to include alternative embodiments to the extent permitted by the prior art.

What is claimed is:

1. A method for determining a shift in optical wavelength, comprising:
generating light having a first wavelength at a first location;
directing said generated light towards an area of interest;
receiving light reflected from said area of interest at about said first location, wherein at least some of said reflected light comprises at least a portion of said generated light;
directing a first portion of said received reflected light along a first optical path to form a first beam;
directing a second portion of said received reflected light along a second optical path to form a second beam:
delaying a first portion of said received light directed along said first optical path by a first delay interval at time t, wherein said delaying a first portion of said received light includes reflecting said first portion of said received light off a first portion of a first mirror assembly;
delaying a second portion of said received light directed along said first optical path by a second delay interval at time t, wherein said delaying a second portion of said received light includes reflecting said second portion of said received light off a second portion of said first mirror assembly;
delaying a third portion of said received light directed along said first optical path by a third delay interval at time t, wherein said delaying a third portion of said received light includes reflecting said third portion of said received light off a third portion of said first mirror assembly, wherein at time t a position of said first mirror assembly is fixed, and wherein time t is about equal to a travel time of light to and from said area of interest;
combining at least some of said first beam with said delayed first portion of said second beam to obtain a first interference signal;
combining at least some of said first beam with said delayed second portion of said second beam to obtain a second interference signal;
combining at least some of said first beam with said delayed third portion of said second beam to obtain a third interference signal;
determining at a common instant in time an intensity of said received interference signals at each of said three different delay intervals, wherein said delays are spaced at known intervals of said first wavelength from one another, wherein time t comprises one instant in time, and wherein said determining an intensity of said received reflected light at three different delay intervals at time t includes measuring an intensity of each of said first, second and third interference signals at time t; and
determining from a ratio of said first, second and third interference signal intensities a change in wavelength between said generated light and said reflected light.

2. The method of claim 1, further comprising:
reflecting said first beam from a common mirror;
reflecting said second beam from said first mirror assembly, wherein said first mirror assembly includes a segmented mirror, wherein said first portion of said second beam is reflected by a first segment of said segmented mirror, wherein said second portion of said second beam is reflected by a second segment of said segmented mirror, and wherein said third portion of said second beam is reflected by a third segment of said segmented mirror.

3. The method of claim 2, wherein said first, second and third segments of said segmented mirror are equal in area.

4. The method of claim 2, wherein said first, second and third segments of said segmented mirror are all parallel to a common plane and wherein a plane of a reflective surface of said first segment is separated from a plane of a reflective surface of said second segment by a distance equal to one-eighth of said first wavelength, and wherein said plane of said reflective surface of said second segment is separated from a plane of a reflective surface of said third segment by a distance equal to one-eighth of said first wavelength.

5. The method of claim 1, further comprising separating said first, second and third portions of said second beam from one another by aperture division.

6. The method of claim 1, wherein said delaying a second portion comprises passing said second portion of said received reflected light of said second beam through a phase retarder.

7. The method of claim 1, wherein said delaying first, second and third portions of said received light directed along said first optical path further includes passing said first, second and third portions of said received reflected light of said second beam through at least one of different portions of a phase retarder and different phase retarders.

8. The method of claim 1, further comprising:
directing said first interference signal to a first detector;
directing said second interference signal to a second detector;
directing said third interference signal to a third detector.

9. The method of claim 1, wherein said directing a first portion of said received reflected light along a first optical path and said directing a second portion of said received reflected light along a second optical path comprises splitting said received reflected light into said first and second portions using a beam splitter.

10. The method of claim 1, further comprising:
calibrating said first and second delays relative to one another, wherein said calibrating includes adjusting at least one of said first delay and said second delay such that light wherein received reflected light at said first wavelength produces first and third intensities that are equal to one another.

11. The method of claim 1, further comprising selecting a first average delay for greater resolution and a second average delay for greater measurement range, wherein said first average delay is greater than said second average delay.

12. The method of claim 1, further comprising:
calibrating said three delay intervals, wherein said calibrating includes adjusting said first and third delay intervals so that said first and third interference signals each are of equal intensity when light of said first wavelength is subjected to said first and third delays, and wherein said determining from a ratio of said interference signal intensities a change in wavelength between said generated light and said reflected light includes:

fitting a sine curve to said measured interference signal intensities;

calculating a change in phase in said sine curve as compared to a calibrated phase;

calculating a change in wavelength from said calculated change in phase;

calculating a velocity of a reflector included in said area of interest relative to said first location from said calculated change in wavelength.

13. A method for determining a shift in optical wavelength, comprising:

generating light having a first wavelength at a first location;

directing said generated light towards an area of interest;

receiving light reflected from said area of interest at about said first location, wherein at least some of said reflected light comprises at least a portion of said generated light;

determining an intensity of said received reflected light at each of three different delay intervals at time t, where t is equal to a travel time to and from said area of interest, and wherein said delays are spaced at intervals of ¼ said first wavelength from one another; and determining from a ratio of said intensities a change in wavelength between said generated light and said reflected light;

directing said received light to a polarizing beam splitter as light linearly polarized at 45° to a plane of incidence of said polarizing beam splitter, wherein said polarizing beam splitter forms a first beam having a first polarization and a second beam having a second polarization that is orthogonal to said first polarization;

passing said first beam through a first quarter wave plate;

reflecting said first beam back through said first quarter wave plate;

passing said second beam through a second quarter wave plate;

reflecting said second beam back through said second quarter wave plate;

recombining said first and second beams in said polarizing beam splitter, wherein said first and second beams are directed along a third optical path;

directing a first portion of said first and second beams from said third optical path to a first polarization scrambler and to a first detector;

passing a second portion and a third portion of said first and second beams through a third quarter wave plate;

after said passing said second portion and third portions of said first and second beams through a third quarter wave plate, directing said second portion of said first and second beams to a second polarization scrambler and to a second detector;

passing said third portion of said first and second beams through a fourth quarter wave plate;

after said passing said third portion of said first and second beams through a fourth quarter wave plate, passing said third portion of said first and second beams through a third polarization scrambler and to a third detector; and wherein said determining an intensity of said received reflected light at each of three different delay intervals at time t includes determining an intensity of a signal received at each of said first, second and third detectors at time t.

14. A device for measuring small shifts in optical wavelengths, comprising:

a light source, wherein said light source provides light at a first wavelength;

a first beam splitter, wherein light from said light source and reflected back to said device is divided into first and second beams that traverse first and second optical paths having different path lengths;

a first mirror, wherein light directed along said first optical path is reflected by said first mirror;

a second mirror, wherein light directed along said second optical path is reflected by said second mirror;

at least one of a phase retarder and a stepped surface included in said second mirror, wherein said second beam is sub-divided into at least first, second and third delay paths each having different magnitudes of delay, wherein said delays span at least one-half said first wavelength, and wherein at a time during which said second beam is subdivided into said first, second and third delay paths a position of said second mirror is fixed;

a detector assembly, wherein an intensity of each signal resulting from interference between light that has been delayed by said at least three different delays and light that has been directed along said first path is measured; and a trihedral prism, wherein a first division of said second beam comprising light delayed by a first amount combined with a first portion of said first optical path light is directed to a first area of said detector assembly, wherein a second division of said second beam comprising light delayed by a second amount combined with a second portion of said first optical path light is directed to a second area of said detector assembly, and wherein a third division of said second beam comprising light delayed by a third amount combined with a third portion of said first optical path light is directed to a third area of said detector assembly.

15. The device of claim 14, wherein said second mirror of said device has a stepped surface.

16. The device of claim 14, wherein said second mirror has a stepped surface that includes three parallel reflective segments, wherein a first of said reflective segments is separated from a second of said reflective segments by a distance equal to one-eighth said first wavelength, wherein said second reflective segment is separated from a third of said reflective segments by a distance equal to one-eighth said first wavelength, and wherein said first reflective segment is separated from said third reflective segment by a distance equal to one-fourth said first wavelength.

17. The device of claim 14, wherein said device includes a phase retarder.

18. The device of claim 14, wherein said device includes a phase retarder comprising a number of quarter wave plates.

19. The device of claim 14, wherein said beam splitter comprises a polarizing beam splitter, and wherein said device further comprises:

a linear polarizer, wherein said light reflected back to said device is provided by said linear polarizer to said polarizing beam splitter, and wherein said polarizing beam splitter has an axis of polarization that is 45 degrees to a plane of incidence of said polarizing beam splitter.

20. The device of claim 19, further comprising:
a first quarter wave plate in a path of said first beam and adjacent to said first mirror; and
a second quarter wave plate in a plate in a path of said second beam and adjacent said second mirror.

21. The device of claim 14, wherein said detector assembly comprises a charge coupled device.

22. The device of claim 14, wherein said detector assembly includes:
a first detector element coincident with said first area of said detector assembly and associated with said first delay path;
a second detector element coincident with said second area of said detector assembly and associated with said second delay path;
a third detector element coincident with said third area of said detector assembly and associated with said third delay path.

23. The device of claim 14, wherein said light source comprises a pulsed laser light source.

24. The device of claim 23, wherein said pulsed laser light source has a coherence length of at least 0.5 meters.

25. The device of claim 14, wherein said first mirror is integral to said beam splitter.

26. The device of claim 14, further comprising:
a processor, wherein an intensity of an interference signal from each of said first, second and third delay paths is provided to said processor by said detector device, and wherein a ratio of said intensities is taken in connection with determining a velocity of a reflector within said target area.

27. The device of claim 14, further comprising an actuator, wherein a length of said first, second and third delay paths can be altered simultaneously in response to movement of said actuator.

28. An apparatus for determining a relative velocity of a target, comprising:
means for generating light, wherein said light includes a first wavelength;
means for receiving a reflected signal, wherein said reflected signal includes a reflected portion of said light from said means for generating light;
means for directing said received reflected signal, wherein at least a first portion of said received selected signal is directed along a first path and wherein at least a second portion of said received selected signal is directed along a second path;
means for differentially delaying three segments of said second portion of said received reflected signal relative to one another;
means for mixing said light directed along said first paths with said light directed along said second of said paths, wherein three interference signals are obtained;
means for simultaneously detecting an intensity of each of said three interference signals;
means for determining from a ratio of said intensities a change in wavelength between said generated light and said reflected light.

29. The apparatus of claim 28, wherein said means for differentially delaying three segments of said second portion of said received reflected signal relative to one another includes a stepped mirror, said apparatus further comprising:
means for separating said three interference signals into three separate paths for delivery to said means for simultaneously detecting, wherein said means for separating includes a trihedral prism.

30. The apparatus of claim 28, wherein said means for differentially delaying three segments of said second portion of said received reflected signal relative to one another includes a phase retarder.

31. The apparatus of claim 28, wherein said means for differentially delaying three segments of said second portion of said received reflected signal relative to one another includes a quarter wave plate.

32. The apparatus of claim 28, further comprising:
means for determining a ratio of said intensities of said interference signals.

33. The apparatus of claim 32, further comprising:
means for determining a velocity of said target from said ratio of said intensities.

34. The apparatus of claim 28, wherein said second portion of said received reflected signal comprises a beam, and wherein said three segments of said second portion of said received reflected signal each comprise an equal area of a transverse section of said beam.

* * * * *